United States Patent
Ehrlich et al.

(10) Patent No.: US 8,984,056 B2
(45) Date of Patent: Mar. 17, 2015

(54) INTER POINT OF PRESENCE SPLIT ARCHITECTURE

(71) Applicant: Limelight Networks, Inc., Tempe, AZ (US)

(72) Inventors: Ofir Ehrlich, Tel Aviv (IL); Dima Potekhin, Tel Aviv (IL); Tomer Altman, Tel Aviv (IL); Leonid Fainberg, Qiryat Gat (IL); Gil Shai, Givataim (IL); Ofer Gadish, Rishon Le'Tzion (IL); Jason Hofmann, New York, NY (US); Jason Wolfe, Gilbert, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 209 days.

(21) Appl. No.: 13/741,051

(22) Filed: Jan. 14, 2013

(65) Prior Publication Data
US 2014/0047061 A1    Feb. 13, 2014

Related U.S. Application Data

(63) Continuation of application No. 13/571,320, filed on Aug. 9, 2012, now Pat. No. 8,356,074, and a continuation of application No. 13/571,318, filed on Aug. 9, 2012, now Pat. No. 8,612,588.

(51) Int. Cl.
G06F 15/16     (2006.01)
H04L 29/08     (2006.01)
G06F 12/00     (2006.01)

(52) U.S. Cl.
CPC .......... H04L 67/322 (2013.01); H04L 67/2847 (2013.01); H04L 67/2814 (2013.01); H04L 67/1021 (2013.01); H04L 67/288 (2013.01)

USPC .......................... 709/203; 709/213; 709/250

(58) Field of Classification Search
USPC .......... 709/203, 213, 217–219, 223–229, 250
See application file for complete search history.

(56) References Cited

U.S. PATENT DOCUMENTS

| 5,884,098 A | 3/1999 | Mason, Jr. |
| 6,654,807 B2 | 11/2003 | Farber et al. |

(Continued)

FOREIGN PATENT DOCUMENTS

| KR | 20030029244 A | 4/2003 |
| WO | 2011041709 A1 | 4/2011 |

OTHER PUBLICATIONS

AAPT & EdgeCast, "Content Delivery Network", 2012, p. 1-4. Retrieved on Sep. 5, 2012 from http://www.aapt.com.au/sites/default/files/pdf/CDN_Brochure_15-05-2012.pdf.

(Continued)

*Primary Examiner* — Zarni Maung
(74) *Attorney, Agent, or Firm* — Kilpatrick Townsend & Stockton LLP

(57) ABSTRACT

A system and method for accelerating web page delivery is disclosed in one embodiment. Web content requests are made to an edge server of a first point of presence (POP) of a content delivery network (CDN). The web content has embedded resource links. The first POP can rewrite the embedded resource links to route requests for the embedded resource links to any POP in the CDN or even the origin server. In some embodiments, the first POP can decide if the first POP and/or another POP referenced in a rewritten embedded resource link should cache and/or accelerate the resource referenced in the embedded resource link.

20 Claims, 8 Drawing Sheets

(56) References Cited

U.S. PATENT DOCUMENTS

| | | |
|---|---|---|
| 6,754,699 B2 | 6/2004 | Swildens et al. |
| 6,976,090 B2 | 12/2005 | Ben-Shaul et al. |
| 7,293,093 B2 | 11/2007 | Leighton et al. |
| 7,337,248 B1 | 2/2008 | Rao et al. |
| 7,395,355 B2 | 7/2008 | Afergan et al. |
| 7,706,280 B2 * | 4/2010 | Raciborski et al. ........... 370/237 |
| 8,028,090 B2 | 9/2011 | Richardson et al. |
| 8,199,752 B2 | 6/2012 | Swanson et al. |
| 8,219,645 B2 * | 7/2012 | Harvell et al. ................ 709/219 |
| 8,219,647 B2 | 7/2012 | Harvell et al. |
| 8,356,074 B1 * | 1/2013 | Ehrlich et al. ................ 709/203 |
| 8,583,763 B1 * | 11/2013 | Kim et al. .................... 709/218 |
| 8,612,588 B1 * | 12/2013 | Ehrlich et al. ................ 709/224 |
| 2004/0205208 A1 | 10/2004 | Koponen et al. |
| 2007/0162434 A1 | 7/2007 | Alessi et al. |
| 2008/0071859 A1 | 3/2008 | Seed et al. |
| 2009/0254661 A1 | 10/2009 | Fullagar et al. |
| 2011/0016180 A1 | 1/2011 | Bharadhwaj et al. |
| 2011/0276446 A1 | 11/2011 | Gupta et al. |
| 2011/0302321 A1 | 12/2011 | Vange et al. |
| 2012/0041970 A1 | 2/2012 | Ghosh et al. |
| 2012/0185370 A1 | 7/2012 | Davie et al. |
| 2012/0198022 A1 | 8/2012 | Black et al. |
| 2012/0198069 A1 | 8/2012 | Black et al. |
| 2012/0254343 A1 | 10/2012 | Harvell et al. |

OTHER PUBLICATIONS

Pallis et al., "Insight and Perspectives for Content Delivery Network", Jan. 2006, vol. 49, p. 1-6. Retrieved on Sep. 5, 2012 from http://gridsec.usc.edu/files/EE657/P2P-CDNetworks-Survey-2006.pdf.

* cited by examiner

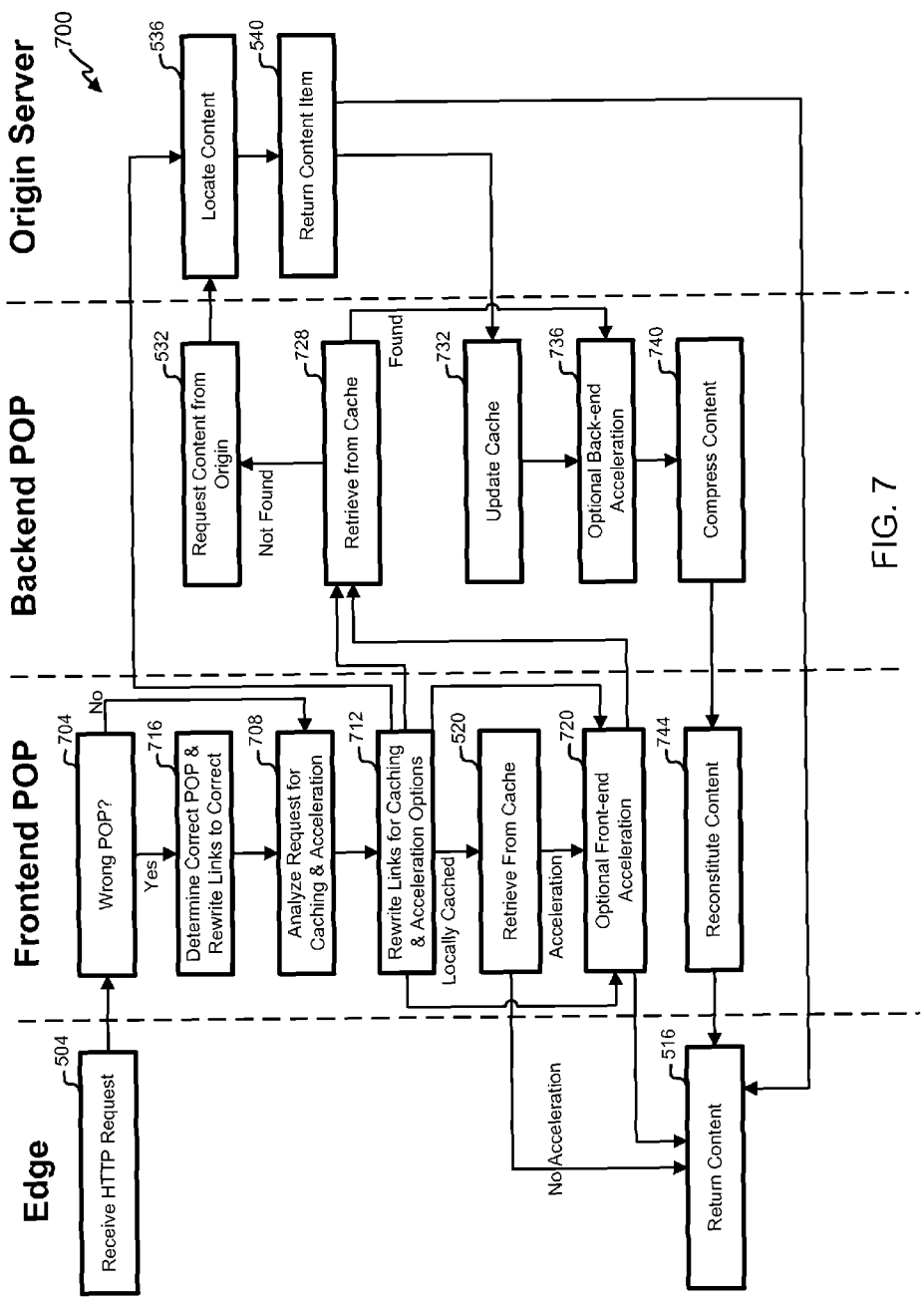

INTER POINT OF PRESENCE SPLIT ARCHITECTURE

CROSS-REFERENCE TO RELATED APPLICATIONS

This application is a continuation of U.S. application Ser. No. 13/571,320, filed on Aug. 9, 2012 and of U.S. application Ser. No. 13/571,318, filed on Aug. 9, 2012. Each of these applications is hereby incorporated by reference in its entirety for all purposes.

BACKGROUND

This disclosure relates in general to content delivery networks (CDNs) and, but not by way of limitation, to accelerating web page delivery for a CDN.

The speed users expect from web browsing is increasing. After requesting a web page, only a fraction of second can pass before a user presumes a web page is inoperative or lacking sufficient quality of service (QoS). Caching is used to speed delivery of certain web content, but that caching is largely ineffective for dynamic content that is changing frequently or has components that change. The best web sites are the most responsive from the end user's perspective.

CDNs have a geographically distributed network of points of presence (POPs) such that one is likely to be close to the end user. A request for content is matched to a nearby POP using routing, domain name service (DNS) diversion, redirection, Anycast and/or other techniques. An edge server in the POP will serve up the content from its cache, a host within the CDN or an origin server depending on where the content is located. For content that is missing from the CDN, the request to the origin server can be costly in terms of QoS because of delay and bandwidth costs.

SUMMARY

In one embodiment, a system and method for accelerating web page delivery is disclosed in one embodiment is disclosed. Web content requests are made to an edge server of a first point of presence (POP) of a content delivery network (CDN). The web content has embedded resource links. The first POP can rewrite the embedded resource links to route requests for the embedded resource links to any POP in the CDN or even the origin server. In some embodiments, the first POP can decide if the first POP and/or another POP referenced in a rewritten embedded resource link should cache and/or accelerate the resource referenced in the embedded resource link.

In another embodiment, a CDN having a plurality of POPs is disclosed that includes one or more processor for executing instructions and one or more storage media for retaining instructions. The instructions perform several things such as: receiving a request for web content at a first POP from an end user for content stored on an origin server, wherein: the web content includes a plurality of resource links, the first POP is part of the plurality of POPs, and the first POP comprises: an front-end optimization engine, and a front-end cache; identifying a second POP that is located closer to the origin server than the first POP, wherein: the second POP is part of the plurality of POPs, and the second POP comprises: a back-end optimization engine, and a back-end cache; and rewriting a resource link of the plurality of resource links of the web content, wherein the rewritten resource link is changed to reference the second POP, another POP from the plurality of POPs or the origin server.

In yet another embodiment, a CDN having a plurality of POPs for delivering third party content to end users and including a first POP and a second POP is disclosed. The first POP receives a request for web content from an end user for content stored on an origin server. The web content includes a plurality of resource links. The first POP is part of the plurality of POPs. The first POP includes a front-end optimization engine, and a front-end cache. The second POP is located closer to the origin server than the first POP. The second POP is part of the plurality of POPs. The second POP includes a back-end optimization engine, a back-end cache and a decision engine. The decision engine rewrites a resource link of the plurality of resource links of the web content. The rewritten resource link is changed to reference the second POP, another POP from the plurality of POPs or the origin server.

In still another embodiment, a method for accelerating delivery of third party content using a CDN having a plurality of POPs is disclosed. A request for web content is received at a first POP from an end user for content stored on an origin server. The web content includes a plurality of resource links. The first POP is part of the plurality of POPs. The first POP includes an front-end optimization engine, and a front-end cache. A second POP is identified that is located closer to the origin server than the first POP. The second POP is part of the plurality of POPs. The second POP includes a back-end optimization engine, and a back-end cache. A resource link of the plurality of resource links of the web content is rewritten. The rewritten resource link is changed to reference the second POP, another POP from the plurality of POPs or the origin server.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 7 illustrates a swim diagram of another embodiment of a process for delivery of web content with optional caching and acceleration.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
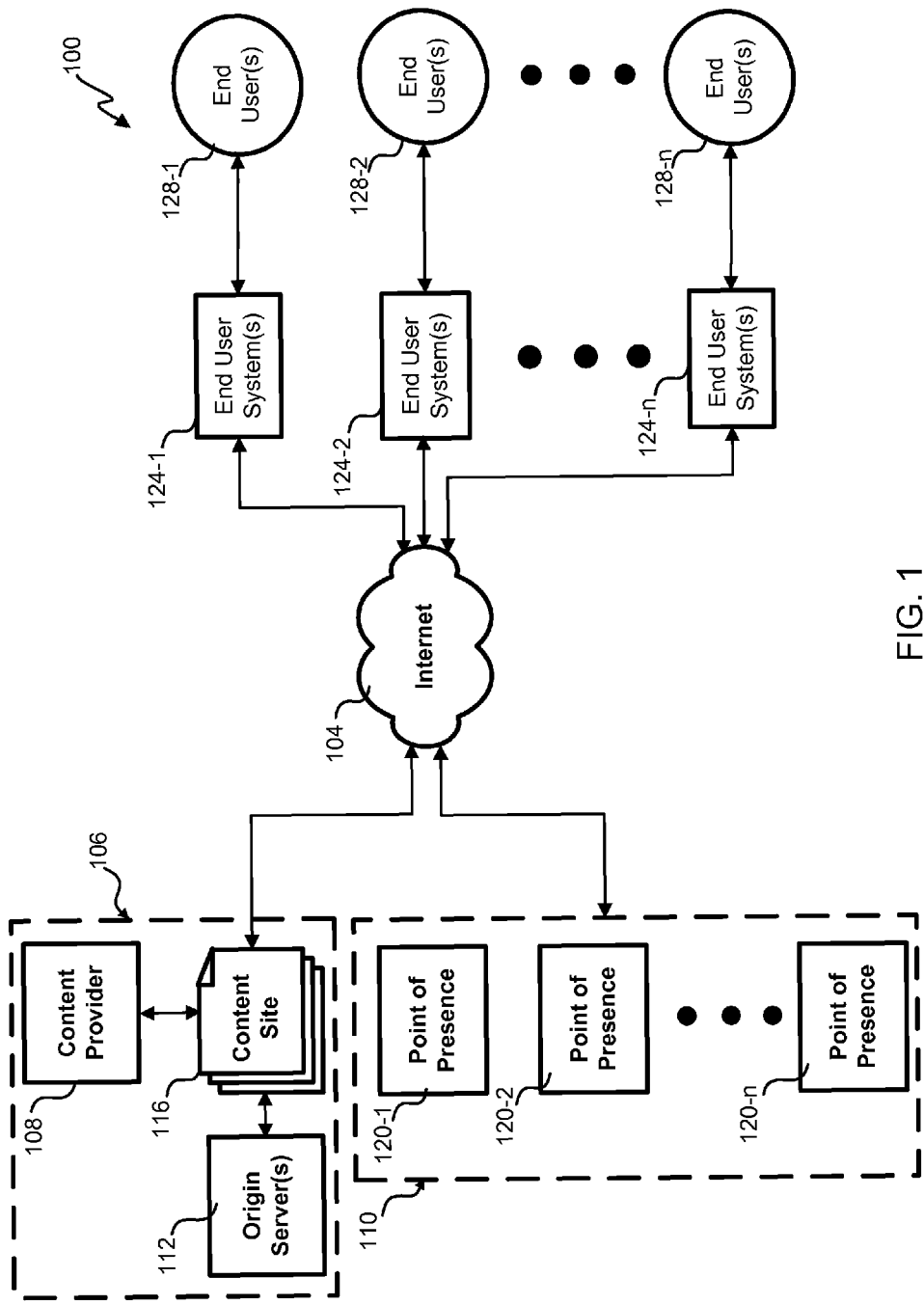
FIG. 1 depicts a block diagram of an embodiment of a content distribution system.

Referring first to FIG. 1, a block diagram of an embodiment of a content distribution system 100 is shown where a content originator 106 offloads delivery of the content objects to a content delivery network (CDN) 110. In this embodiment, the content distribution system 100 can dynamically and efficiently serve content objects (e.g., Javascript applets, images, Hypertext Markup Language (HTML), videos, Flash animations, etc.) over the Internet 104 to end user systems 102 by an efficient use of caches and acceleration within the CDN 110. For example, content objects used frequently on a webpage may be provided to user quickly even if the content object is dynamic. Caching by domain, sub-domain, origin server, IP address at a point of presence (POP) 120 near the content originator allows accumulation of different variations of dynamic content is a way that caching at an edge server is unlikely to achieve.

An end user 128 may request a set of content object, e.g., by requesting a webpage associated with one or more of content objects. For example, a user may request a file, such as a HTML file. The HTML file may include dynamic content that is customized for some or groups of end users 128. A source of each of the content objects and/or the file may be on an edge server, a host server within the CDN, the origin server 112, the content site 116, or on a cache in another POP 120. Where a cache or host outside the POP 120 receiving the request has the content object, differential ("diff") coding, delta coding and/or compression can be used to reduce the transportation cost and delay associated with transferring the content object or portion of a content object missing from the POP 120.

A content originator 106 produces and/or distributes content objects as the originator of content in a digital form for distribution with the Internet 104. Included in the content originator 106 are a content provider 108, a content site 116 and an origin server 112. The figure shows a single origin server 112, but it is to be understood embodiments could have multiple origin servers 112 that each can serve streams of the content object redundantly. For example, the content originator 106 could have multiple origin servers 112 and assign any number of them to serve the content object. The origin servers 112 for a given content site 116 could be widely distributed with some even being hosted by the CDN 110.

Although this figure only shows a single content originator 106 and a single CDN 110, there may be many of each in other embodiments. The content object is any content file or content stream and could include, for example, video, pictures, advertisements, applet, data, audio, software, HTTP content, and/or text. The content object could be live, delayed or stored. Throughout the specification, references may be made to a content object, content, and/or content file, but it is to be understood that those terms could be generally used interchangeably wherever they may appear. Some content is dynamic in that different end users 128 get different variations of the content, such that the dynamic content is not easily cached at the edge with the variations being pushed out of the cache before they might be requested again.

Many content providers 108 use the CDN 110 to deliver the content objects over the Internet 104 to end users 128. When a content object is requested by an end user 128, the CDN 110 may retrieve the content object from the content provider 108 for loading in a cache or hosting for a period of time. Alternatively, the content provider 108 may directly provide the content object to the CDN 110 for hosting, i.e., in advance of the first request or in servicing the first request. In this embodiment, the content objects are provided to the CDN 110 through caching and/or pre-population algorithms and stored in one or more servers such that requests may be served from the CDN 110. The origin server 112 holds a copy of each content object for the content originator 106. Periodically, the contents of the origin server 112 may be reconciled with the CDNs 110 through a cache and/or pre-population algorithm. Some embodiments could populate the CDN 110 with content objects without having an accessible origin server such that the CDN serves as the origin server, a host or a mirror. The CDN 110 can store entire content objects or portions of content objects.

The CDN 110 includes a number of points of presence (POPs) 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 102. A wide area network (WAN), the Internet 104 and/or other backbone may couple the POPs 120 with each other and also couple the POPs 120 with other parts of the CDN 110. Other embodiments could couple POPs 120 together with the Internet 104 optionally using encrypted tunneling.

When an end user 128 requests a content link through its respective end user system 102, the request for the content is passed either directly or indirectly via the Internet 104 to the content originator 106. The request for content, for example, could be an HTTP Get command sent to an IP address of the content originator 106 after a look-up that finds the IP address. The content originator 106 is the source or re-distributor of content objects. The content site 116 is accessed through a content web site 116 in this embodiment by the end user system 102. In one embodiment, the content site 116 could be a web site where the content is viewable by a web browser. In other embodiments, the content site 116 could be accessible with application software other than a web browser. The content provider 108 can redirect content requests to any CDN 110 after they are made or can formulate the delivery path beforehand when the web page is formulated to point to the CDN 110. In any event, the request for content is handed over to the CDN 110 for fulfillment in this embodiment.

Once the request for content is passed to the CDN 110, the request is associated with a particular POP 120 within the CDN 110. A routing algorithm used to choose between different POPs 120 could be based upon efficiency, randomness, and/or proximity in Internet-terms, defined by the fabric of the Internet and/or some other mechanism. Other embodiments could find a POP 120 close to the end user system 124 using domain name service (DNS) diversion, redirection, Anycast and/or other techniques. The particular POP 120 then assigns or routes the request to an edge server. The particular POP 120 may retrieve the portion of the content object from the content provider 108. Alternatively, the content provider 108 may directly provide the content object to the CDN 110 and its associated POPs 120, i.e., in advance of the first request. In this embodiment, the content objects are provided to the CDN 110 and stored in one or more CDN servers such that the portion of the requested content may be served from the CDN 110. The origin server 112 holds one copy of each content object for the content originator 106. Periodically, the content of the origin server 112 may be reconciled with the CDN 110 through a cache, hosting and/or pre-population algorithm.

An edge server serving the request to the end user system 124 may access the requested content—either by locally retrieving part or all of the content or requesting it from another server. In some instances, the edge server determines a source for part or all of the requested content within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a relay server or ingest server. If part or all of the content cannot be found in the POP 120 originally receiving the request, neighboring POPs 120 could serve as the source in some cases, or the content could be sourced from the content originator 106.

Thus, a request from an end user system 102 for content may result in requests for content from one or more servers in the CDN 110. A CDN server (e.g., an edge server, peer servers, an origin server, etc.) may analyze requested content objects (e.g., requested HTML files), determined versions of the content objects that are cached locally, and transmit to other CDN servers a modified requested for content objects while signaling the versions of the content objects that are cached locally.

The end user system 102 processes the content for the end user 128 upon receipt of the content object. The end user system 102 could be a personal computer, media player, handheld computer Internet appliance, phone, IPTV set top, streaming radio or any other device that can receive and play content objects. In some embodiments, a number of end user systems 102 can be networked together sharing a single connection to the Internet 104. Changes could be made by the CDN 110 that does not affect the end user realization of the content except to speed delivery.

Figure 2A:
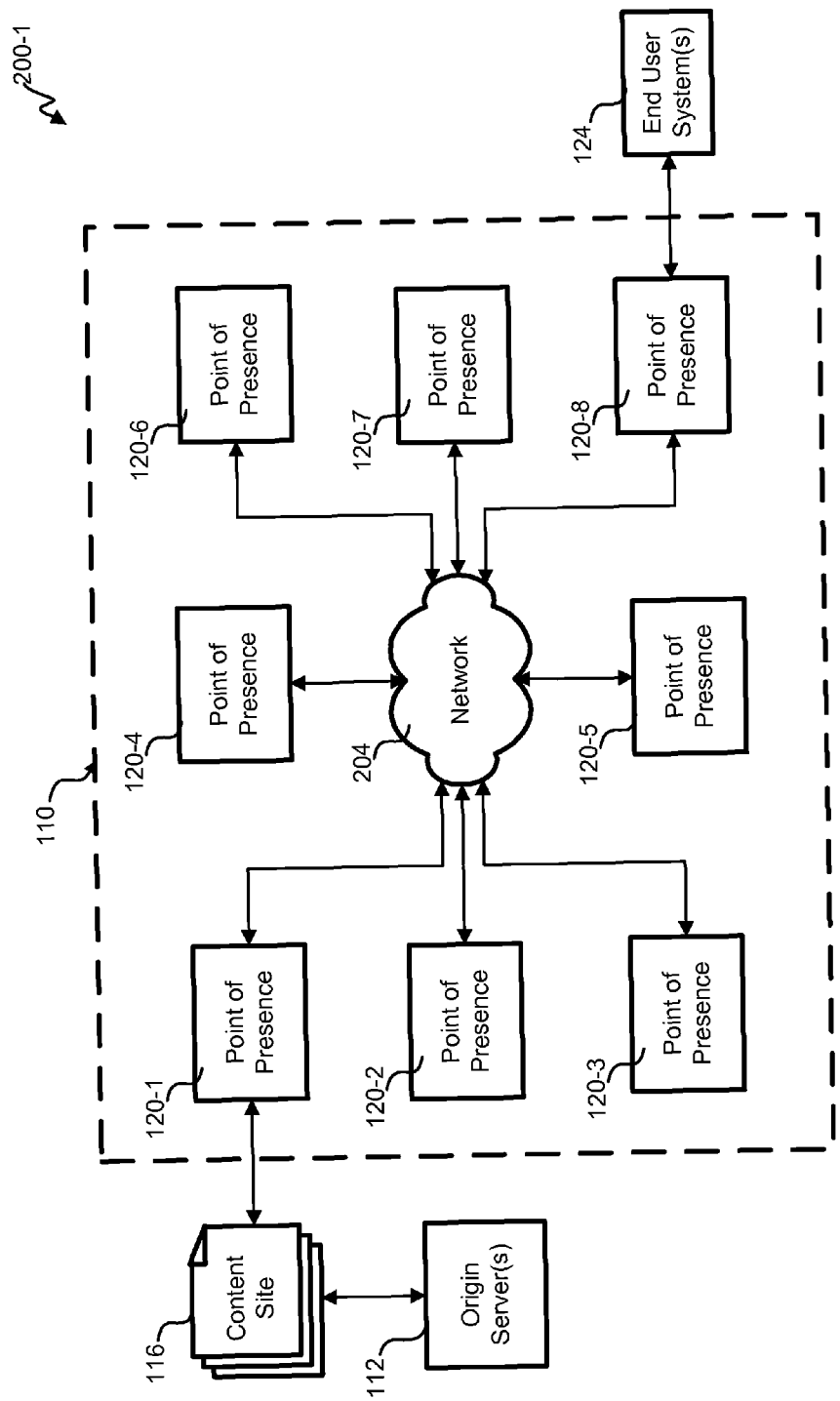
FIGS. 2A and 2B depict block diagrams of embodiments of web delivery system.

With reference to FIG. 2A, a block diagram of an embodiment of web delivery system 200-1 is shown. In this example, there are eight POPs 120 all interconnected by a network 204 that may include both private WAN or Internet 104 elements to allow communication between the POPs 120. This embodiment uses the CDN 110 to accelerate delivery of content objects by caching content sites and origin servers at a first POP 120-1 nearby for all the other POPs that might request content objects associated with the content site 116 and/or origin server.

In the depicted example, the end user system 124 requests a content object and has the request assigned to an eighth POP 120-8. The eighth POP 120-8 would determine a POP assigned to each domain, sub-domain, IP address, or other portion of the HTTP request to divide the requests between the various POPs 120. Other embodiments could use a variable or field in the HTTP request to assign HTTP requests to a particular POP 120 nearby the origin server 112 or content site 116. For example, the content site could be at a domain of ACME.gov that is assigned to the first POP 120-1. A server in the first POP 120 would provide the requested content from its cache and retrieve the content object from the content site 116 upon a cache miss.

It is to be appreciated that the first POP 120-1 will receive request from all POPs 120 in the CDN 110 for a given assigned domain. The cache in the first POP 120-1 will populate with the full spectrum of requests for the assigned domain. Compression algorithms, diff coding and/or delta coding is used between the frontend POP 120-8 and backend POP 120-1 to more efficiently use the network 204.

Figure 2B:
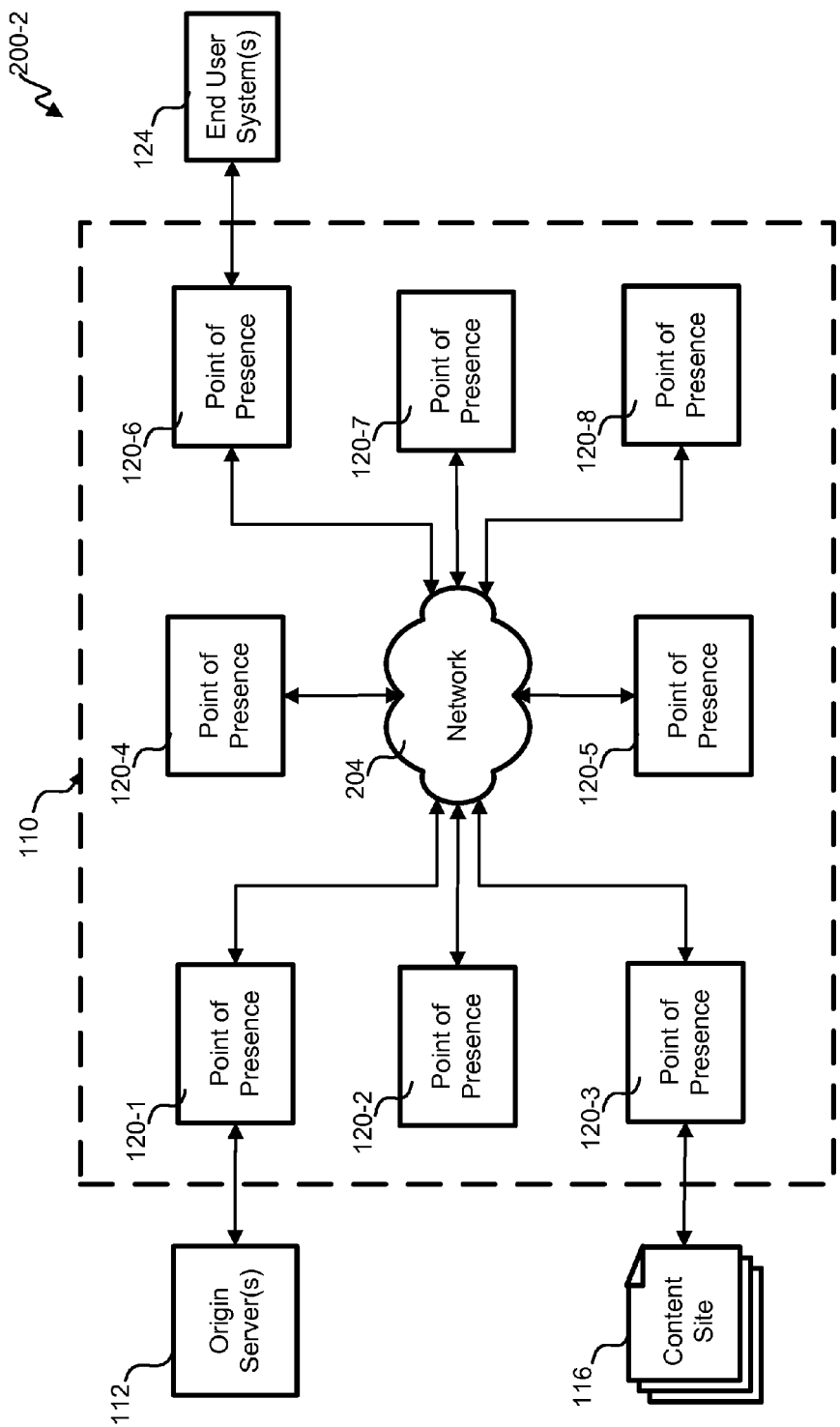

Referring next to FIG. 2B, a block diagram of an embodiment of web delivery system 200-2 is shown. In this embodiment, an end user system 124 is assigned to the sixth POP 120-6 of the CDN 110. A given HTTP request is for a content site 116 that is assigned a third POP 120-3 for fulfillment of those requests. Certain portions of the HTTP file may call for content objects stored on the origin server 112 that is assigned to a first POP 120-1. In this way, the fulfillment duties can be spread out among the POPs 120. This embodiment assigns origin servers 112 and content sites 116 according to an algorithm that chooses from among the POPs according to the one with the lowest latency, but other embodiments could make that choice based upon a function of latency, bandwidth, bandwidth cost, POP resources, POP loading, server resources, server loading, cache size, cache speed, and/or any other factor that affects quality of service (QoS).

Figure 3:
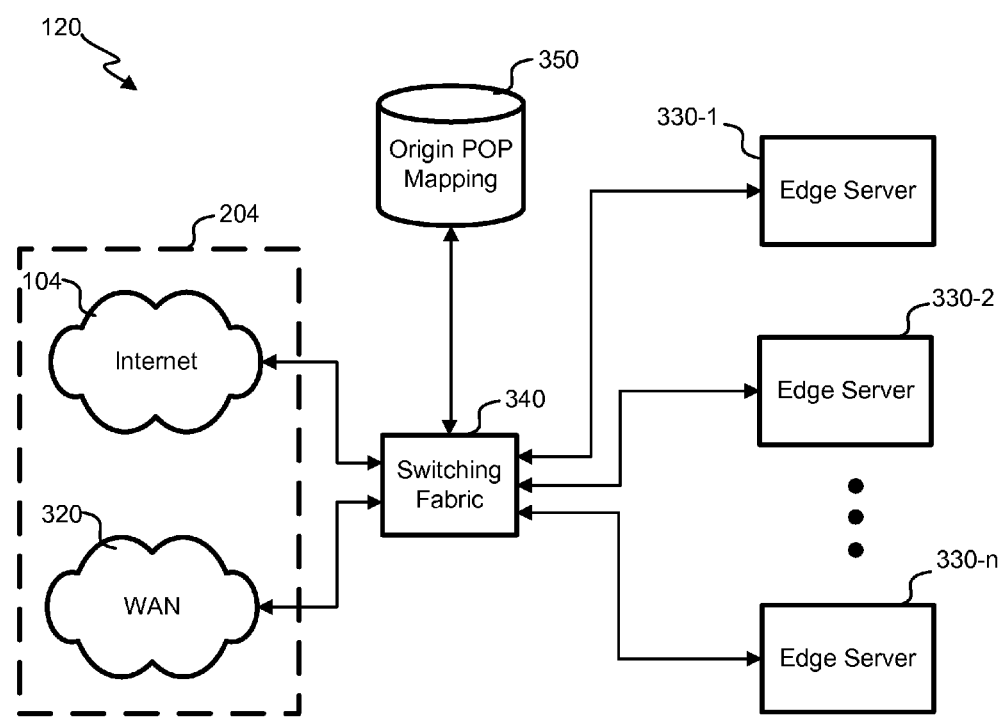
FIG. 3 depicts a block diagram of an embodiment of a point of presence (POP)

With reference to FIG. 3, a block diagram of an embodiment of a POP 120 is shown. A number of edge servers 330 are used to perform various functions in the POP 120. The edge servers 330 are hardware computers that can have one or more different functions instantiated for performing the various functions of the POP 120. The instantiations can be scaled up and down as different services are requested from the POP 120. The services offered include content hosting, content caching, web acceleration, compression, video and/or audio streaming, domain name service, cloud computing, gaming hosting, flash engines, encoding, etc. A particular edge server 330 can have several instantiations of the same or different services running simultaneously.

The edge servers 330 support web acceleration between POPs 120. The edge server 330 rewrites the URLs or links in web pages to refer to another POP closer to the source of the content requested in the URL. When a HTTP request is received by an edge server 330, the origin POP mapping store 350 is queried to find the POP that will intermediate requesting the HTTP. Should the origin POP mapping store 350 not have an entry for the domain, the POPs 120 can probe for quick accessibility to the origin server for the domain. Alternatively, algorithms or databases could be used to estimate the location of the domain to select a nearby POP. In this way, one POP is near the end user 128 and the other is near the origin server or content site for the HTTP universal resource locator (URL).

The switching fabric 340 routes information within the POP 120. Additionally, assignment of requests is performed by the switching fabric 340 using load balancing, round robin, random or another scheme to divide the processing between the edge servers 330 configured to perform a particular task. Where a request is received and it is determined that the frontend POP is not close to the end user system 124, in networking terms, the switching fabric 340 can redirect or reroute the request to another POP. Alternatively, the assigned edge server 330 can rewrite the links in the web page to reference the POP closer to the end user system 124.

Referring to Table I, a sampling of the information in the origin POP mapping store 350 is shown. Mapping can be keyed off any portion for the URL to specify a backend POP 120. For example, IP address 104.18.640.1 is mapped to the POP 120 located in Tempe, the subdomain of Blue.Realure- .com is mapped to the Denver POP 120, the path of Limelight.net/Aus/ is mapped to the Austin POP 120.

TABLE I

Origin POP Mapping

| Domain | POP |
|---|---|
| 104.18.640.1 | Tempe |
| Franklin.info | East Bay |
| Blue.Realure.com | Denver |
| Limelight.com | San Jose |
| Townsend.com | Atlanta |
| Limelight.net/Aus/ | Austin |
| Sidewalkpaint.com | San Diego |
| media.Samba.org | London |
| ... | ... |
| USPTO.gov | Alexandria |

Some URLs are not rewritable, such as those generated by Javascript™, that have unique variables or coding specific to an end user or that are required to be in a certain format for whatever reason. The edge server 330 can recognize those circumstances such that the edge server 330 would not rewrite the URL and would instead directly contact the content site or origin site without a hop through another POP. Additionally, the edge server 330 recognizes when the current POP is both the closest to the end user 128 and the source of the content. The edge server 330 could directly contact the content source or the edge server 330 in the same POP that handles web caching for that domain. It could be the same edge server 330.

Figure 4:
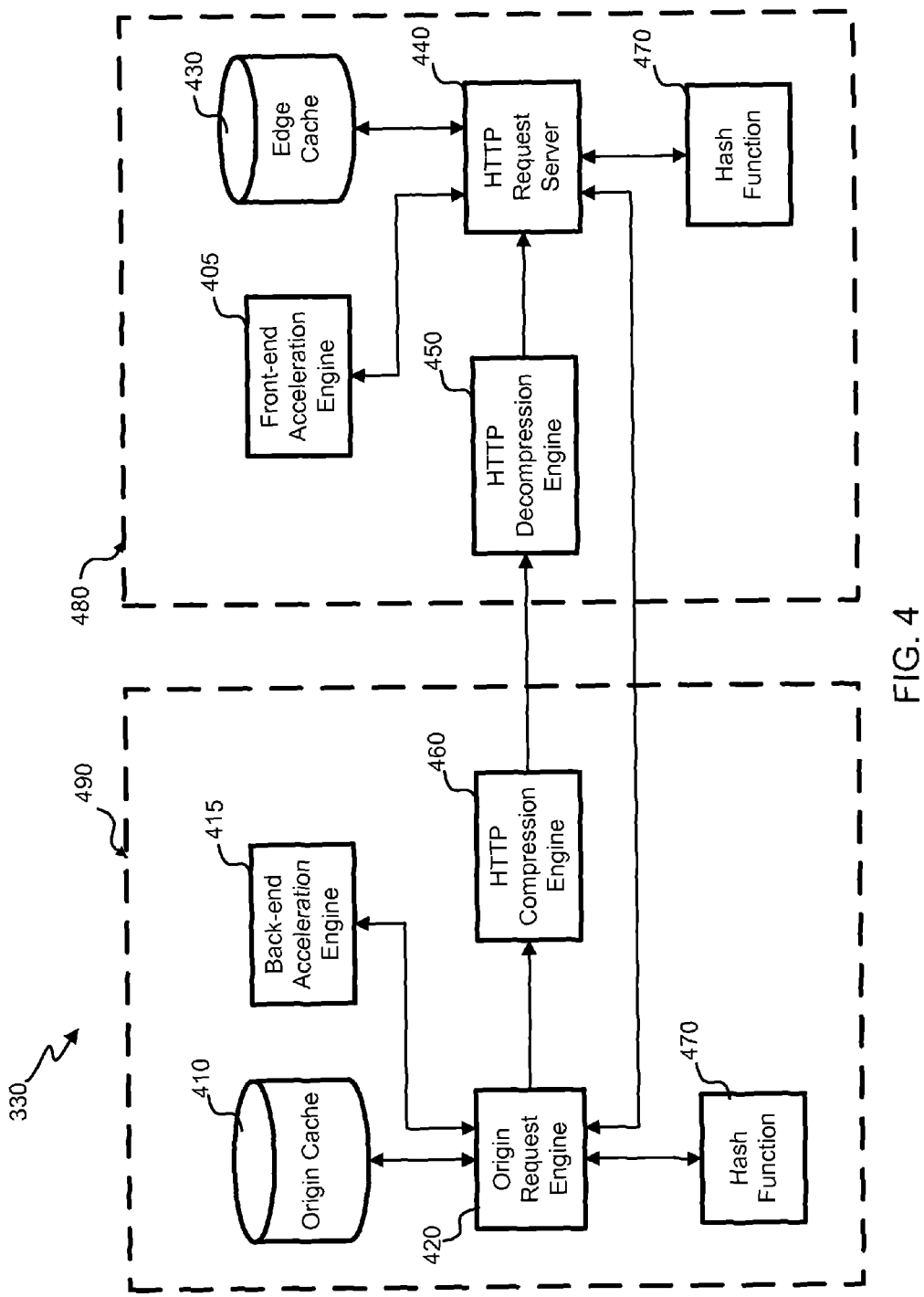
FIG. 4 depicts a block diagram of an embodiment of an edge server.

Referring next to FIG. 4, a block diagram of an embodiment of an edge server 330 running both ends of the interPOP acceleration in a split architecture is shown. It is to be understood that the functions of the frontend edge server 330 and the backend edge server 330 could be instantiated on the same or different physical hardware servers. For explaining the figure, a requesting function 480 is performed in a frontend POP 120 and a fulfillment function 490 is performed in a backend POP 120. The requesting function 480 includes an HTTP decompression engine 450, an HTTP edge cache 430, a HTTP request server 440, frontend acceleration engine 405, and a hash function 470. The fulfillment function 490 includes a HTTP compression engine 460, an origin request engine 420, a back-end acceleration engine 415, and an origin cache 410.

The HTTP request server 440 receives the connection from the end user system 124. The content specified in the URL could be stored in the frontend edge server 330. The HTTP request server 440 analyzes the request to characterize the web page and embedded links for various conditions. Table II shows examples of the different conditions that are screened for. Once a condition is recognized, split processing is specified. For example, if the HTTP request server finds that the HTML being requested is dynamic and possibly unique to the end user 128, the split processing condition specified by the HTTP request server 440 is non-cacheable HTML.

TABLE II

Web Page Processing

| Condition | Split Processing |
|---|---|
| Containerized Objects | Non-cacheable Resource |
| Dynamic HTML | Non-cacheable HTML |
| No Backend POP Assigned | Front-end Requested Resource |

TABLE II-continued

Web Page Processing

| Condition | Split Processing |
|---|---|
| Static Web Page | Cachable HTML |
| ... | ... |
| Wrong Frontend POP | Assign Resources to Correct POP |

Table III shows what functions are involved with a given split processing condition. The split processing defines whether a backend POP 120 will be involved and where caching and acceleration is performed. Although not shown in the table, the HTTP request server 440 can also define if two-level caching is performed with frontend cache using backend caching as a parent cache and whether compression is used between the frontend and backend POPs 120. In this manner, caching, acceleration and/or interPOP compression can be specified on an individual web page or link basis.

TABLE III

Split Processing

| | Frontend POP | | Backend POP | |
|---|---|---|---|---|
| Split Processing | Accelerate | Cache | Accelerate | Cache |
| Cachable HTML | Yes | Yes | Yes | No |
| Cachable Non-frontend-optimized Resource | No | Yes | No | Yes |
| Cachable Frontend Optimized Resource | Yes | Yes | Yes | No |
| Frontend Requested Resource | Yes | Yes | No | No |
| Non-cacheable HTML | Yes | No | Yes | No |
| Non-cacheable Resource | Yes | No | Yes | No |
| Acceleration Engine Resource | Yes | No | No | No |

When specified, the edge cache 430 is queried for content corresponding to the URL or similar URLs. Content items in the edge cache 430 are indexed by a hash of the content item itself. The content cached can be HTTP, an entire file, a portion of a file, a function, a piece of run-time code, etc. A hash function 470 performs a hash of the content items stored in the edge cache 430 and the edge cache 430 is indexed by hash.

Acceleration techniques speed the user experience. Many acceleration techniques rewrite web sites on the fly, that is to say after their request. To achieve the acceleration, links can be rewritten, HTML can be abbreviated or rewritten to run more efficiently, scripts and HTML can be rewritten or reordered. The frontend POP can turn on or off acceleration in either the frontend and/or the backend POP 120. In some embodiments, individual acceleration techniques can be selectively turned on and off for each web page request or link.

For content not found in the edge cache 430, the URL is optionally passed to the fulfillment function 490 in the backend POP determined by reference to the origin POP mapping store 350. Hashes for the content items found in the edge cache 430 are added to the URL so that the origin request engine 420 knows what content items are stored in the edge cache 430. The origin request engine 420 checks the origin cache to see if the content item is stored in the POP 120. Where the content item is not found locally, the origin server 112 or content site 116 can be queried for the content item.

Once the content item is found or retrieved, it can be delivered to the requesting function 480. Since the origin request engine 420 knows the content items stored at the edge cache 430 and knows what is in the content items from a prior request from the requesting function 480, the origin request engine 420 can do a diff or delta function to determine only the unique components using the HTTP compression engine 460. The compressed item is passed to the HTTP decompression engine 450 with information on how to reconstitute the content item. Optionally, the changed information found through diff or delta coding can be further compressed using algorithms that find patterns and redundancies to further reduce the size. Although not shown, link layer and/or persistent compression at higher layers can be performed on all content passing interPOP.

The HTTP request server 440 stores the reconstituted content item after using the hash function to find a hash used to create an index for the edge cache. The reconstituted content item is passed to the end user system 124 that made the initial request. In this way, two-level caching is used to accelerate content delivery in one embodiment. The connection between the frontend POP 120 and the backend POP 120 could be over the Internet 104, a private or leased-line WAN 320 or an encrypted tunnel over the Internet 104 in various embodiments.

Both the frontend and backend POPs can perform web page acceleration. This acceleration is an accumulation of processing techniques to optimize the end user experience when viewing web pages. Generally, the most interesting content in the web page is sped up using a number of techniques. These techniques can optimize different portions of the delivery chain, for example, the back-end acceleration engine 415 can optimize gathering information from the origin server along with accelerating how that information is provided to the frontend POP 120. The frontend acceleration engine 405 can optimize gathering content from the backend POP 120 or the origin server. The frontend and backend acceleration engines 405 optional have additional caching functionality separately indexed as part of their various optimization's.

The HTTP request server specifies various processing by adding information and rearranging links. For example, the backend POP 120 could be specified as a subdomain in the URI and whether caching is performed specified in a variable in the rewritten link. Links are passed between functions in a given POP 120 or between POPs 120. Other embodiments could use a signaling channel separate from the link to specify the processing. Some embodiments could specify specific caching parameters, acceleration techniques and compression parameters in the rewritten links.

Figure 5:
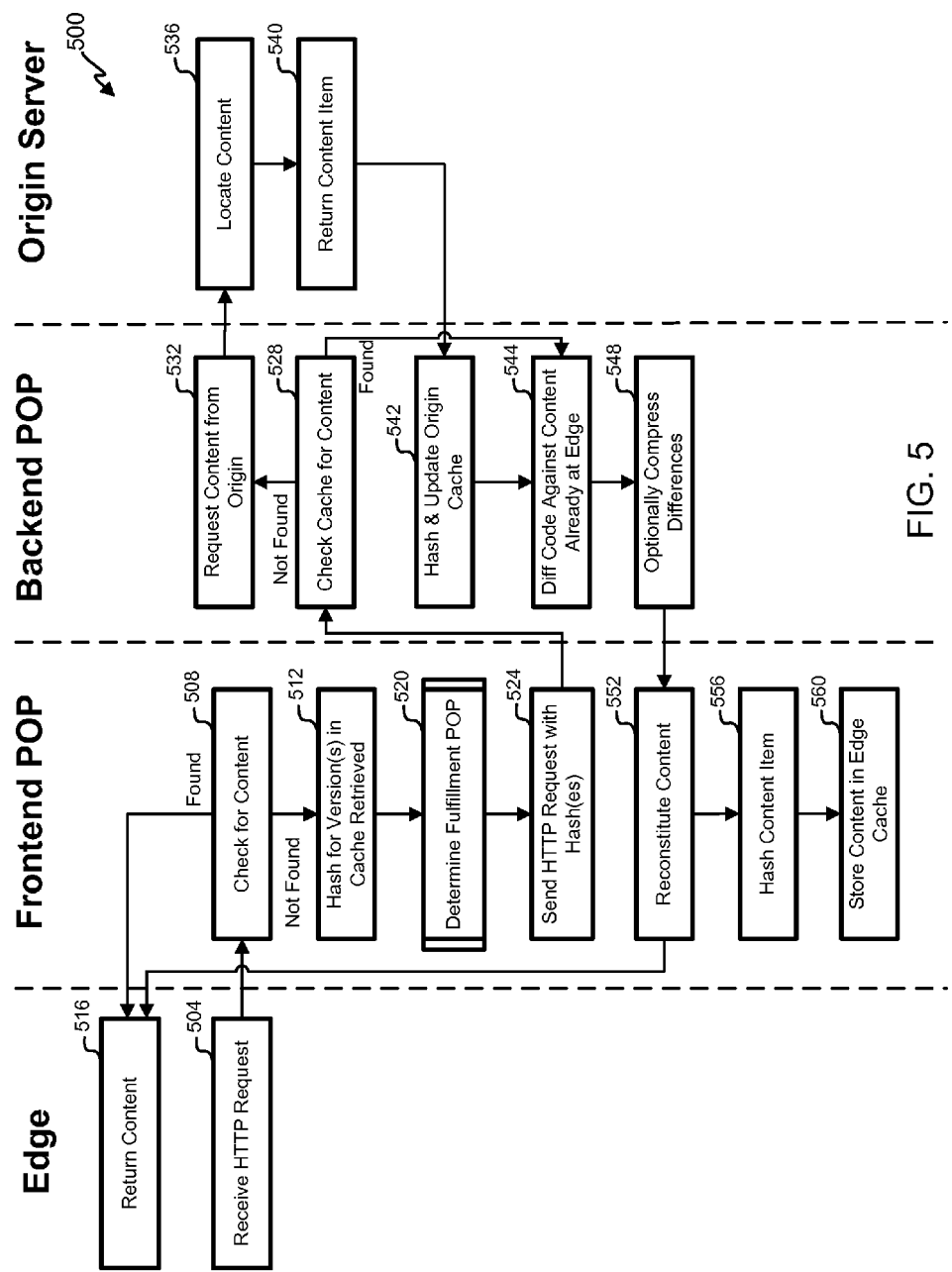
FIG. 5 illustrates a swim diagram of an embodiment of a process for accelerated delivery of web content.

With reference to FIG. 5, a swim diagram of an embodiment of a process 500 for accelerated delivery of web content is shown. The depicted portion of the process begins in block 504 where the requesting function 480 in a frontend POP 120 receives a HTTP request in the form of a URL or link. To use the CDN 110, the URL has been rewritten to point to a domain of the CDN 110. Through any of a number of techniques, the frontend POP 120 is chosen because it is nearby, in an Internet sense, to the end user system 124. In block 508, the HTTP request server 440 checks for the content item in the edge cache 430. Where the content item is found, it is returned to the end user system 124 in block 516.

In the event that the content item is not found, the hashes for the similar content items are retrieved from the cache are retrieved from the edge cache in block 512. The backend POP 120 is determined in block 520. The HTTP request is sent with embedded hashes in block 524. The fulfillment function 490 receives the HTTP request and checks the origin cache 410 for the content item in block 528. Where the content item is found, processing continues to block 544 where diff or delta coding is used to only return the unique portions of the content item. Optional compression of those differences is performed in block 548.

The processed content item is passed to HTTP request server 440 for reconstitution in block 552. In block 556, the content item is hashed with the hash function 470. The content item is stored in the edge cache 430 in block 560. In block 516, the content item is returned to the end user system. Blocks 556 and 560 can be performed after returning the content item in block 516.

Returning to block 528 under the scenario that the origin cache 410 does not have a copy of the content item, processing continues to block 532 where the content is requested from the origin server 112 or content site 116. In block 536, the content is located and returned to the backend POP 120 in block 540. Next, the fulfillment function 490 hashes the content item and updates the origin cache 410 in block 542. Diff or delta coding is performed in block 544 and processing continues as outlined above to update the edge cache 430 and deliver the content item to the end user system.

Figure 6:
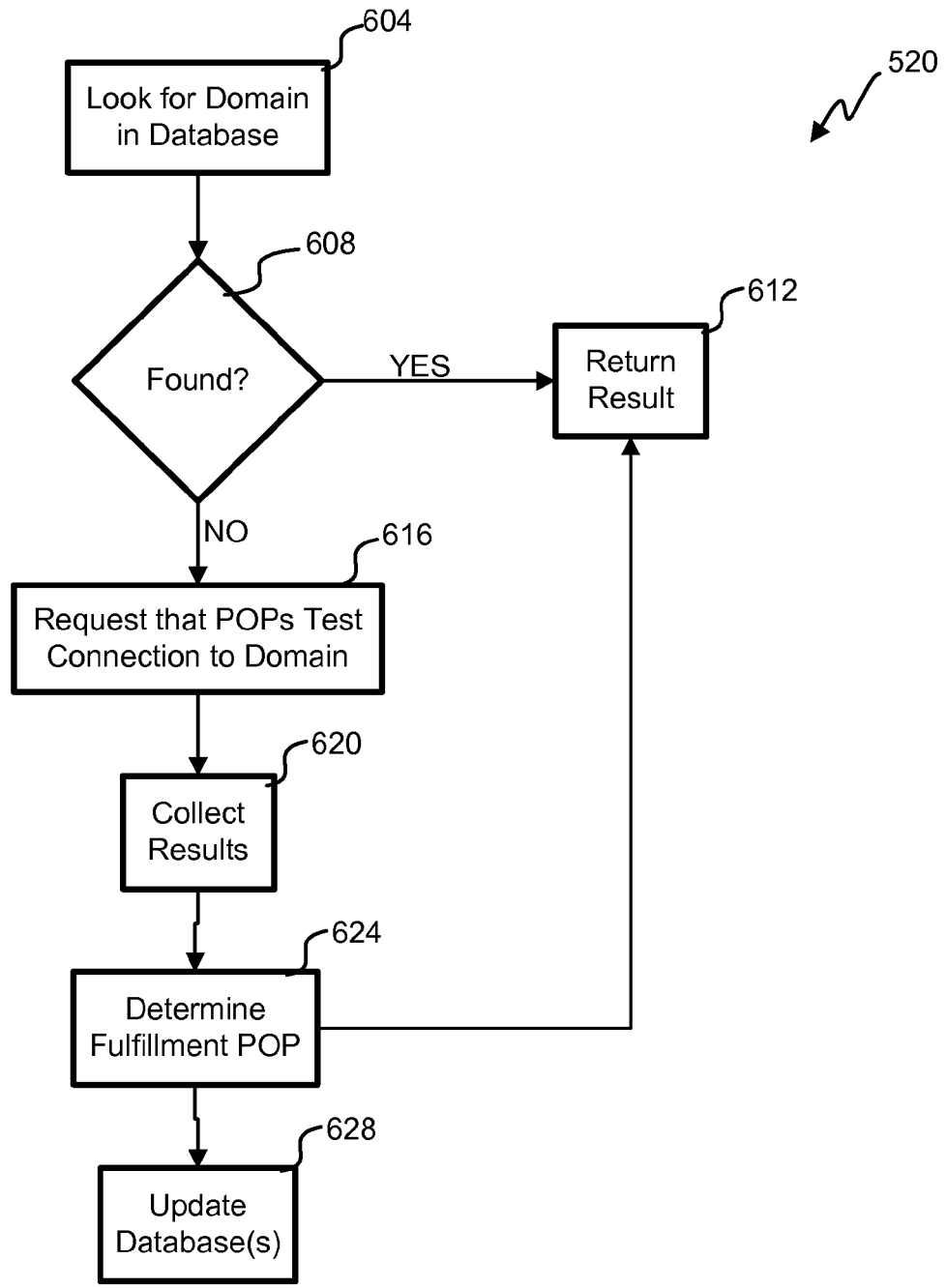
FIG. 6 illustrates a flowchart of an embodiment of a process for updating the mapping of origin server domains to POPs of the content delivery network (CDN)

Referring next to FIG. 6, a flowchart of an embodiment of a sub-process 520 for updating the mapping of origin server domains to POPs of the CDN 110 is shown. In block 604, the domain or other source indicator is searched for in the origin POP mapping store 350. If found in block 608, the resulting POP is returned in block 612. Where there is no backend POP 120 in the origin POP mapping store 350, processing goes from block 608 to block 616 to cause all the POPs to test their connection to the domain. The results are collected in block 620 to determine the backend POP in block 624. The result is returned to the HTTP request server 440 in block 612. The origin POP mapping store 350 is updated in block 628. Other embodiments could find the backend POP without testing each connection by looking up the estimated location for the domain and choosing a nearby POP 120.

A number of variations and modifications of the disclosed embodiments can also be used. For example, although above embodiments discuss interPOP compression of HTTP content, other embodiments could compress any type of content object between POPs. Signaling of what is found in the frontend POP could use mechanisms other than embedding a code or hash in the URL, for example using an API or signaling channel.

With reference to FIG. 7, a swim diagram of another embodiment of a process 700 for delivery of web content with optional caching and acceleration is shown. This embodiment details the different types of caching and acceleration that can be specified for a web page or link. The depicted portion of the process 700 begins in block 504 where a frontend POP 120 receives a HTTP request. The location of the DNS or DNS cache used by the end user system 124 often defines which frontend POP 120 will be initially chosen as an approximation of the location of the end user system 124, but that premise can often be wrong such that a POP 120 is used that is not close. The IP address of the end user system 124 can be used to determine if the wrong POP was initially chosen and where that is the case the request can be routed, redirected or just have the links rewritten to the correct POP 120 in block 716.

In block 708, conditions in the web page are analyzed to determine the split architecture processing. Several processing paths branch out from block 708. The link(s) are rewritten to specify the caching and acceleration to be performed in specified POPs. For example, a frontend POP 120 might be specified for caching the content without using acceleration after a determination that acceleration is unlikely to aid the end user experience. Where content is locally cached, processing continues to block 520 to retrieve the content and optionally acceleration in block 720 before returning the content in block 516.

Back to block 708, it could be determined that a backend POP 120 should be used. Where the backend POP 120 is not used, the content can be directly gathered from the origin server in blocks 536 and 540 before it is returned in block 516. Where the frontend POP 120 decides to use a backend POP 120, processing can go to block 728 for retrieval of the content from the origin cache 410 and on a cache miss, requesting the content from the origin in blocks 532, 536, 540. The content found at the origin is updated into the cache in block 732. Optional acceleration is performed in block 736 before returning the content to the frontend POP 120.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A content delivery network (CDN) comprising:
a plurality of points of presence (POPs);
one or more processors for executing instructions to:
receive a request for web content, at a first POP of the plurality of POPs, from an end user for content stored on an origin server, wherein:
the request for web content includes a first uniform resource identifier (URI),
the first POP is part of the plurality of POPs, and
the first POP comprises:
a front-end optimization engine, and
a front-end cache;
identify a second POP that is located closer to the origin server than the first POP, wherein:
the second POP is part of the plurality of POPs, and
the second POP comprises:
a back-end optimization engine, and
a back-end cache;
rewrite the first URI to create a second URI, wherein:
the second URI comprises at least a part of the first URI,
the second URI comprises an additional segment, and
the additional segment specifies how the web content is to be processed by the CDN;
pass the second URI between functions within the first POP, between functions within the second POP, or from the first POP to the second POP; and
one or more storage devices for storing at least a portion of the instructions.

2. The CDN as recited in claim 1, wherein the additional segment specifies that the web content is to be processed in the second POP.

3. The CDN as recited in claim 1, wherein the additional segment specifies an acceleration technique.

4. The CDN as recited in claim 1, wherein the additional segment specifies a caching parameter.

5. The CDN as recited in claim 1, wherein the additional segment specifies a compression parameter.

6. The CDN as recited in claim 1, wherein the second URI identifies the second POP.

7. The CDN as recited in claim 6, wherein the second POP is identified as a subdomain in the second URI.

8. A content delivery network (CDN) for delivering third party content to end users, the CDN comprising:
 a plurality of POPs;
 a first POP of the plurality of POPs, which receives a request for web content from an end user for content stored on an origin server, wherein:
  the request for web content includes a first uniform resource identifier (URI),
  the first POP is part of the plurality of POPs, and
  the first POP comprises:
   a front-end optimization engine, and
   a front-end cache;
 a second POP, located closer to the origin server than the first POP, wherein:
  the second POP is part of the plurality of POPs, and
  the second POP comprises:
   a back-end optimization engine, and
   a back-end cache; and
 a decision engine that rewrites the first URI to create a second URI by adding an additional segment to at least a portion of the first URI, wherein:
  the additional segment specifies how the web content is to be processed in the CDN, and
  the second URI is passed between functions within the first POP, between functions within the second POP, or from the first POP to another POP of the plurality of POPs.

9. The CDN for delivering third party content to end users as recited in claim 8, wherein the decision engine is located in the first POP.

10. The CDN for delivering third party content to end users as recited in claim 8, wherein the additional segment specifies an acceleration technique.

11. The CDN for delivering third party content to end users as recited in claim 8, wherein the additional segment specifies a caching parameter.

12. The CDN for delivering third party content to end users as recited in claim 8, wherein the second POP processes the web content as specified by the second URI.

13. The CDN for delivering third party content to end users as recited in claim 8, wherein the first POP processes the web content as specified by the second URI.

14. A method for accelerating delivery of third party content using a content delivery network (CDN) comprising a plurality of points of presence (POPs), the method comprising:
 receiving a request for web content at a first POP from an end user for content stored on an origin server, wherein:
  the request for web content includes a first uniform resource identifier (URI),
  the first POP is part of the plurality of POPs, and
  the first POP comprises:
   an front-end optimization engine, and
   a front-end cache;
 identifying a second POP that is located closer to the origin server than the first POP, wherein:
  the second POP is part of the plurality of POPs, and
  the second POP comprises:
   a back-end optimization engine, and
   a back-end cache; and
 rewriting the first URI to create a second URI, wherein:
  the second URI comprises at least a part of the first URI,
  the second URI comprises an additional segment, and
  the additional segment specifies how the web content is to be processed by the CDN; and
 passing the second URI between functions within the first POP, between functions within the second POP, or between POPs.

15. The method for accelerating delivery of third party content using the CDN comprising the plurality of POPs as recited in claim 14, the method further comprises processing the web content as specified by the additional segment, and wherein the processing the web content is performed by the second POP.

16. The method for accelerating delivery of third party content using the CDN comprising the plurality of POPs as recited in claim 14, wherein the additional segment specifies an acceleration technique.

17. The method for accelerating delivery of third party content using the CDN comprising the plurality of POPs as recited in claim 14, wherein the additional segment specifies a caching parameter.

18. The method for accelerating delivery of third party content using the CDN comprising the plurality of POPs as recited in claim 14, wherein the additional segment specifies a compression parameter.

19. The method for accelerating delivery of third party content using the CDN comprising the plurality of POPs as recited in claim 14, wherein the second POP is identified in the second URI.

20. A computing system configured to perform the machine-implementable method for accelerating delivery of third party content using the CDN comprising the plurality of POPs as recited in claim 14.

* * * * *